(12) United States Patent
Sheafor et al.

(10) Patent No.: US 6,493,407 B1
(45) Date of Patent: *Dec. 10, 2002

(54) SYNCHRONOUS LATCHING BUS ARRANGEMENT FOR INTERFACING DISCRETE AND/OR INTEGRATED MODULES IN A DIGITAL SYSTEM AND ASSOCIATED METHOD

(75) Inventors: Stephen James Sheafor, Boulder, CO (US); James Yuan Wei, Longmont, CO (US)

(73) Assignee: Fusion MicroMedia Corporation, Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/942,011

(22) Filed: Oct. 1, 1997

Related U.S. Application Data

(63) Continuation-in-part of application No. 08/863,875, filed on May 27, 1997, now Pat. No. 5,983,303.

(51) Int. Cl.[7] .............................. H04L 7/00; G06F 13/38
(52) U.S. Cl. ........................ 375/356; 710/21; 710/126; 365/189.04
(58) Field of Search .................... 364/DIG. 2; 327/141; 375/356, 354, 377; 710/126, 21, 100; 365/189.04; 709/232, 101, 200

(56) References Cited

U.S. PATENT DOCUMENTS

| | | | | | |
|---|---|---|---|---|---|
| 4,845,663 | A | * | 7/1989 | Brown et al. | 382/303 |
| 5,289,585 | A | * | 2/1994 | Kock et al. | 395/293 |
| 5,481,677 | A | * | 1/1996 | Kai et al. | 395/280 |
| 5,483,642 | A | * | 1/1996 | Okazawa et al. | 395/306 |
| 5,490,253 | A | * | 2/1996 | Laha et al. | 395/304 |
| 5,500,949 | A | * | 3/1996 | Saito | 711/100 |
| 5,590,124 | A | * | 12/1996 | Robins | 370/258 |
| 5,666,551 | A | * | 9/1997 | Fenwick | 395/200.37 |
| 5,751,999 | A | * | 5/1998 | Suzuki | 395/494 |
| 5,768,550 | A | * | 6/1998 | Dean et al. | 395/309 |
| 5,850,521 | A | * | 12/1998 | Morganti et al. | 395/200.38 |

* cited by examiner

*Primary Examiner*—William Luther
(74) *Attorney, Agent, or Firm*—Michael Pritzkau

(57) ABSTRACT

A digital bus arrangement and an associated method are disclosed. The bus arrangement includes an input synchronization layer and an output synchronization layer. Data transfer between the modules is synchronized using a master clock signal such that data originated by one module is latched and placed on the bus in one clock cycle. Thereafter, in a second or subsequent clock cycle, the data is synchronously latched at the other modules of the system such that the data is available to an intended module. No logic circuitry is present between the input and output synchronization layers.

15 Claims, 4 Drawing Sheets

SYNCHRONOUS LATCHING BUS ARRANGEMENT FOR INTERFACING DISCRETE AND/OR INTEGRATED MODULES IN A DIGITAL SYSTEM AND ASSOCIATED METHOD

CROSS-REFERENCE TO RELATED APPLICATION

The present application is a continuation-in-part of U.S. patent application Ser. No. 08/863,875, entitled "BUS ARRANGEMENTS FOR INTERCONNECTION OF DISCRETE AND/OR INTEGRATED MODULES IN A DIGITAL SYSTEM AND ASSOCIATED METHOD", filed May 27, 1997, now U.S. Pat. No. 5,983,303 which is incorporated herein by this reference.

BACKGROUND OF THE INVENTION

The present invention relates generally to a bus arrangement which interconnects a number of modules or components in a digital system and more particularly to a synchronous bus arrangement and associated method for providing high speed, efficient digital data transfer between the modules. Implementation of the bus arrangement is contemplated at chip level, forming part of an overall integrated circuit, and is also contemplated as interconnecting discrete modules within an overall processing system.

Many bus structures have been implemented for purposes of interconnecting modules in a digital system. Module interfacing may generally be performed with relative ease when all of the modules are designed in accordance with the same set of design parameters (i.e., rules) such as, for example, those of a particular manufacturer. However, in the instance of modules designed by different manufacturers or obtained from different sources, complex interface problems may be introduced which, in turn, require significant special provisions (typically in the form of logic circuitry) in order to properly interface with a bus structure.

While the concept of modular components was initially implemented using discrete modules, it should be appreciated that there now exists an industry wide movement toward the use of modular components (i.e., functional blocks) at the integrated circuit level. This movement toward modular design in integrated circuit manufacturing has been fueled, at least in part, by the desire to manage the continually increasing complexity and overall size of integrated circuit chips. As a result of the modular design methodology, however, single IC chips may now incorporate modules which are designed to different standards and which are provided by different sources such that complex interface problems are now present at the chip design level. In an environment such as, for example, a custom IC manufacturing house using modules designed by various sources, such interface problems can be particularly troublesome.

In the prior art, module interface problems are typically resolved by using logic circuitry which resides in the bus structure between the modules. This approach was initially applied for interfacing discrete modules and, as one would expect, later applied for interfacing modules integrated within a single IC. As will be seen, the use of logic circuitry in resolving interface discrepancies is not without a price.

When a bus structure is implemented between a configuration of discrete and/or co-integrated modules, it should be appreciated that the bus structure itself determines, to a significant extent, the highest speed at which the configuration may operate. If the bus structure incorporates logic circuitry, data is subjected to specific delays during any clock cycle. These specific delays are imposed solely by the logic circuitry. If any delay imposed by logic circuitry is longer than the clock cycle, the configuration will fail to operate properly unless the clock speed is adjusted (i.e., reduced) whereby to disadvantageously inhibit the overall data throughput of a particular system.

In spite of this disadvantage, however, logic circuitry forming part of the bus structure remains as the standard approach in resolving the complexity of interface problems between co-integrated modules in an IC. At the same time, it should be noted that this approach has proven to be effective when used in producing relatively small IC's, since bus related problems can be traced in a relatively straightforward manner by observing the overall operation of the chip. In a very large scale IC, however, the complex interactions between the modules in combination with other factors such as, for example, the immense numbers of signals which are present essentially eliminate the possibility of utilizing a simplistic troubleshooting technique. Moreover, other concerns come into play with regard to IC implementations at the very large scales contemplated herein, as will be seen immediately hereinafter.

It should be mentioned that delay times are introduced by factors other than interfacing logic circuitry. For instance, loading (i.e., the number of loads driven by a particular line) and the physical length of the bus structure each cause delays. With particular regard to the design of very large scale IC's, which use the aforedescribed modular approach, bus loading and length are some of the most unpredictable and difficult to control variables. For example, the number of modules can vary from one implementation to the next and/or the physical distribution of the modules on the chip can vary. Thus, the addition of logic circuitry to the bus structure further complicates the design process by adding still more unpredictability to an already substantially unpredictable area.

As will be seen hereinafter, the present invention provides a highly advantageous bus arrangement and associated method which eliminate the need for logic circuitry within the bus arrangement so as to maximize the clock rate at which a particular configuration of integrated and/or discrete digital modules may operate in accordance with a reliable design approach.

SUMMARY OF THE INVENTION

As will be described in more detail hereinafter, there is disclosed herein a bus arrangement and an associated method. The bus arrangement is used in a digital system including three or more modules, which are configured for sending and/or receiving data using one or more respective inputs and/or outputs. The bus arrangement includes an input synchronization arrangement having a plurality of first, input latches. Each input latch includes an input terminal and an output terminal such that each module input is connected with the output terminal of an associated input latch. The bus arrangement also includes an output synchronization arrangement having a plurality of second, output latches each of which includes an input terminal and an output terminal such that each module output is connected with the input terminal of an associated output latch. An interconnection arrangement is provided for electrically interconnecting the output terminals of certain output latches with the input terminals of certain input latches in a predetermined way for transferring data between the modules such that the data does not encounter logic circuitry between the certain input and output latches.

In one aspect of the present invention, a single master clock signal is provided to the modules of the system. Using a first one of the modules, data is generated for use by a second one of the modules. During a first cycle of the master clock signal, data generated by the first module is latched and, thereafter, transferred to all other modules via the bus arrangement. During a second cycle of the master clock signal, the transferred data is latched at all modules other than the first module such that the transferred data is available for use by the intended, second module.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
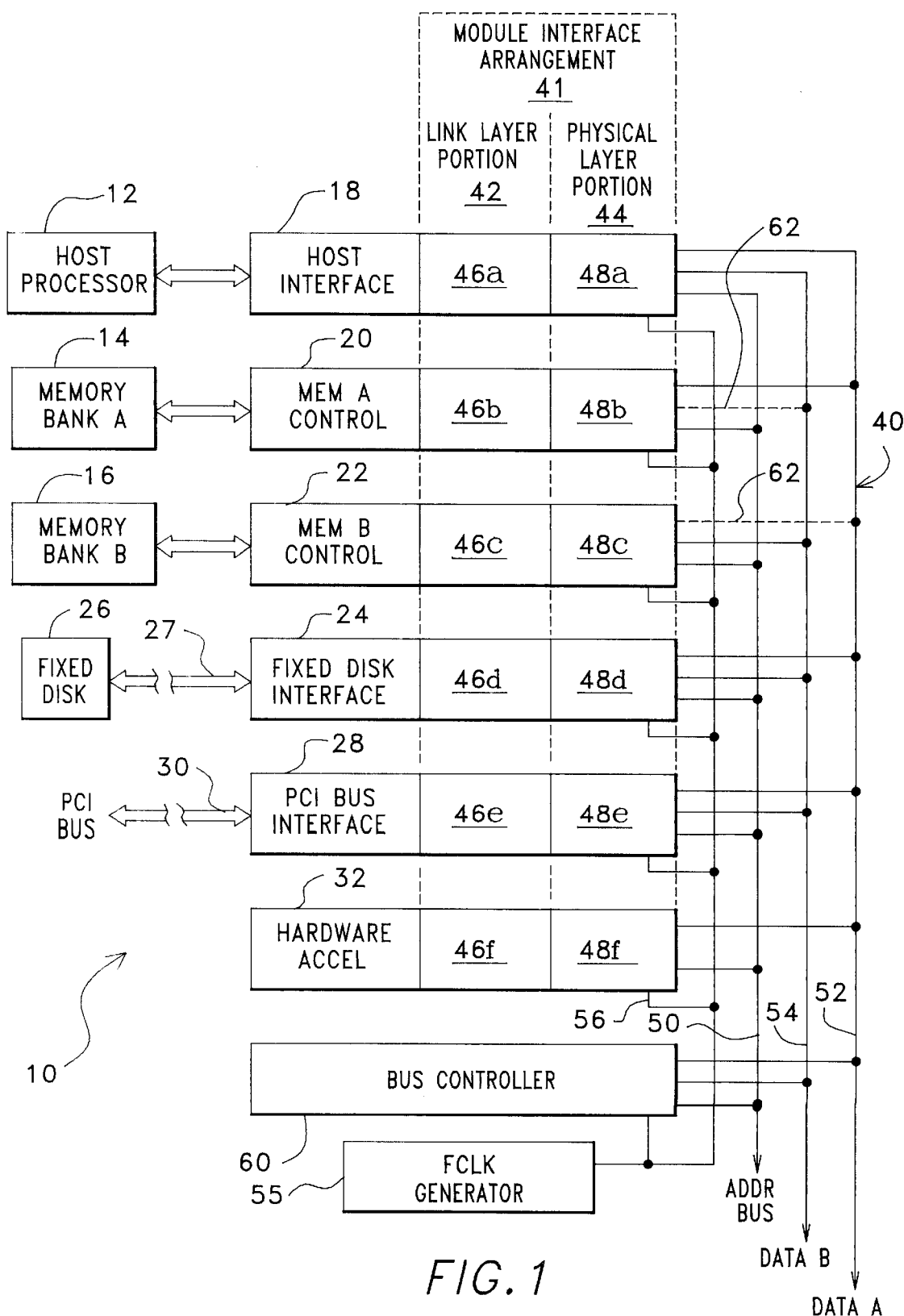
FIG. 1 is a block diagram illustrating a digital system including a synchronous bus arrangement which is implemented in accordance with the present invention.

Attention is immediately directed to FIG. 1 which illustrates one embodiment of a digital system manufactured in accordance with the present invention and generally indicated by the reference numeral 10. System 10 includes a host processor 12, a memory bank A indicated by the reference number 14 and a memory bank B indicated by the reference number 16. Host processor 12 is connected with a host interface module 18. Memory bank A is connected with a memory A control module 20 while memory bank B is connected with a memory B control module 22. It should be appreciated that host interface modules, memory control modules and other modules which are used herein should be designed in view of interface considerations which will be described once the reader has been made aware of relevant details. Memory banks A and B may comprise standard RAM banks having a combined capacity which is suited to the intended system application(s). It is to be understood that substantially any CPU either currently available or to be developed may serve as host processor 12 based upon considerations to be described below and in view of overall performance requirements. System 10 further includes a plurality of additional modules to be described below which are selected so as to fulfill specific functional needs based upon processing requirements of the intended application. For illustrative purposes, these modules will be chosen in a way which serves to best illustrate the advantages which are achieved through the teachings of the present invention.

Continuing to refer to FIG. 1, selected modules which form part of system 10 include a fixed disk interface module 24 which is connected with an external fixed disk 26 via a bus 27, a PCI bus interface module 28 connected with a PCI bus 30 and a hardware accelerator module 32. PCI bus 30 may extend to any number of PCI bus configured peripherals such as, for example, a network interface (not shown). Hardware accelerator 32 may be configured so as to serve any one of a number of functions within the context of the present invention. For example, hardware accelerator module 32 may comprise an inverse discrete cosine transform module (hereinafter IDCT module) which is useful in multimedia image processing. Since a hardware accelerator module is dedicated to a particular task, its design may be optimized so as achieve a very high processing speed in performing that particular task.

System 10 also includes a bus arrangement implemented in accordance with the present invention and generally indicated by the reference number 40. Bus arrangement 40 includes a module interface arrangement 41 which is comprised of a link layer portion 42 which interfaces directly with a physical layer portion 44. Link layer portion 42 provides the individual modules in the system with an interface to the overall bus arrangement in the form of individual link layers 46a–f Physical layer portion 44 includes a plurality of individual physical layers 48a–f which are associated with respective link layers 46a–f Physical layers 48a–f, in turn, are each connected with an address bus 50 and are selectively connected with a data bus A indicated by reference number 52 and a data bus B indicated by the reference number 54. Selective connection of individual module physical layers with data buses A and B will be discussed at appropriate points below. Bus arrangement 40 also includes a bus controller module 60 which is designed in accordance with the present invention and which is connected with address bus 50 and both data buses. Bus controller 60 serves in all bus arbitration and allocation needs, as will be further described below, At this point, it is worthy of mention that such a multiple data bus arrangement is described in detail in the above referenced U.S. application. However, it is to be understood that the teachings herein are applicable to bus structures such as, for example, a single multiplexed bus, an address bus associated with a single data bus or an address bus associated with two or more data busses.

System 10 further includes an FCLK generator 55, which may also be referred to herein as a master clock signal generator. As will be described at appropriate points hereinafter, the master clock generator provides an FCLK signal to bus controller 60 and to the physical layer associated with each module within system 10 using an arrangement of leads 56. In accordance with the present invention, system 10 (in particular, the physical layer) utilizes the FCLK signal in a highly advantageous and heretofore unseen way which serves to coordinate the transfer of addressing and data information throughout the system using bus arrangement 40.

Having generally described the structure of system 10 including bus arrangement 40 and appreciating that this system represents a relatively complex digital system, a discussion will now be provided which serves to bring into view relatively broad considerations and concepts with regard to the design, operation and many advantages of system 10. Specific operational details, designs and waveform diagrams will be provided within the context of a later discussion.

In system 10, typical modules such as, for example, fixed disk 24, PCI bus interface 28 and hardware accelerator 32 are capable of operating as both masters and "slaves" with respect to one another and with respect to the host processor and connect to both of the data buses. The terms "master"

and "slave" are used in their generally known senses wherein a master requests a data read or write and the slave presents or receives the requested data, as stated previously. The primary exception in module dual master/slave capability in this system are memory controller modules 20 and 22, which possess only slave functionality. That is, the memory modules are subject to read or write requests which are always initiated by another module. In another aspect which is different from most other modules, memory controllers 20 and 22 are each connected to only one data bus by module interface arrangement 41. Specifically, memory A controller module 20 is connected with data bus A via link layer module 46b and physical layer module 48b while memory B controller module 22 is connected with data bus B via link layer module 46c and physical layer module 48c. This data bus/memory arrangement achieves certain advantages in conjunction with the specific way in which address space is allocated between the respective memories in accordance with an overall address allocation scheme which will be described below. It should, however, be noted that memory controller modules 20 and 22 may each be connected (not shown) with both data buses A and B by their respective physical layers, as indicated by dashed lines 62.

Figure 2:
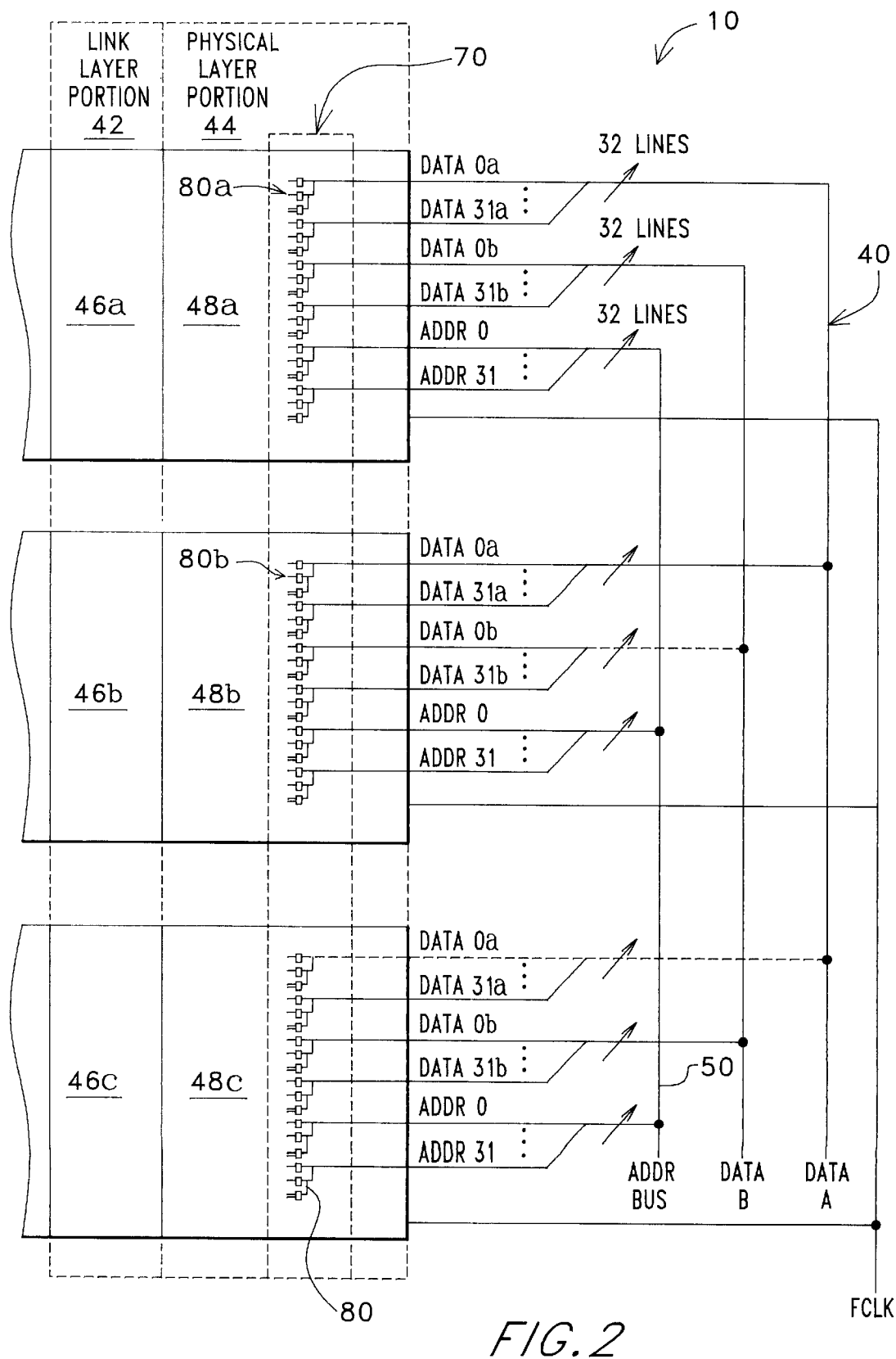
FIG. 2 is a enlarged block diagram of a portion of the system shown in FIG. 1 shown here to illustrate details of the synchronous bus arrangement of the present invention.

Turning to FIG. 2 in conjunction with FIG. 1, system 10 includes a highly advantageous and heretofore unseen flip-flop interface arrangement which is indicated by the reference numeral 70. Flip-flop interface arrangement 70 forms one part of previously described physical layer portion 44. For purposes of clarity, FIG. 2 shows only the physical and link layers associated with host processor 12, memory bank A and memory bank B. Additionally, the buses have been expanded at each module in a way which more clearly illustrates the electrical connection of individual lines of the various buses to the modules. For example, address bus 50 includes address lines ADDR 0 through ADDR 31 while data bus A includes data lines DATA 0a through DATA 31a and data bus B includes data lines DATA 0b through DATA 31b It is to be understood that all modules forming part of system 10 are connected with bus arrangement 40 in a manner similar to that which will be described immediately hereinafter, irrespective of bus width and of the number of individual address and/or data buses in the overall bus arrangement.

Figure 3:
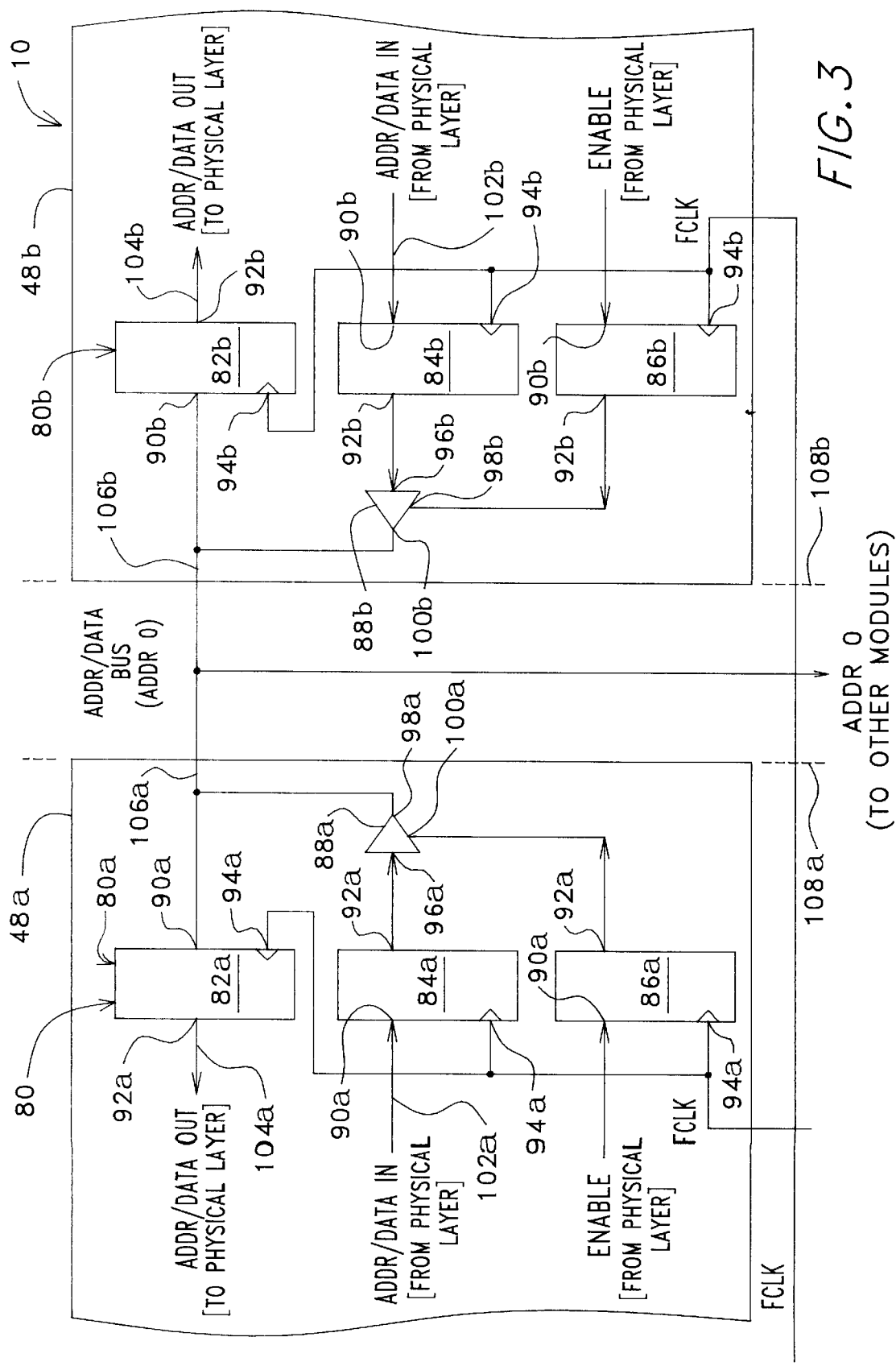
FIG. 3 is a detailed block diagram which illustrates two flip-flop interfaces within the physical layers of respective modules in relation to an address line of the system of FIG. 1 and which further illustrates the interconnection of the components which make up the flip-flop interfaces in accordance with the present invention.

Referring to FIGS. 2 and 3, all address and data lines within system 10 are interfaced with bus arrangement 40 using a plurality of highly advantageous flip-flop interfaces 80, two of which are shown in detail in FIG. 3, as indicated by the reference numerals 80a and 80b. Since these interfaces include identical components, individual components within each flip-flop interface may be individually designated in the drawings and in the following discussions through the addition of "a" or "b" to the reference numbers to be described immediately hereinafter.

Within system 10, flip-flop interfaces 80a and 80b interface address line ADDR 0 with physical layer portion 48a associated with host processor 12 and with physical layer portion 48b associated with memory bank A, respectively. Each flip-flop interface includes an input flip-flop 82, an output flip-flop 84, a drive flip-flop 86 and a tri-state buffer 88. It is noted that these components may be provided in discrete form, in the instance where system 10 is made up of discrete modules, or in integrated form in the instance where system 10 is produced as a single integrated circuit. Flip-flops 82, 84 and 86 may comprise, for example, "D" type edge triggered flip-flops or any suitable latching device which is either known in the art or to be developed. Each flip-flop includes an input 90, an output 92 and a clock input 94. Since such devices are well known in the art, details regarding their operation will not be provided herein. Tri-state buffers 88 may comprise any suitable buffering devices which are capable of selectively transferring data from an input to an output and which are capable of providing a high impedance isolation state wherein their inputs are isolated from their outputs. In this state, the physical layer output flip-flops 84 of the associated module are essentially disconnected from the bus arrangement whereby to reduce the load seen by buffers which are driving data onto the bus arrangement. Like the flip-flops of interface arrangement 70, buffers 88 will not be described in detail with regard to their operation since they are well known in the art. However, it is noted that each buffer 88 includes an input 96, an output 98 and an enable input 100.

Still referring to FIGS. 2 and 3, it is noted that the physical layer of each module in system 10 is configured having separate sets of input and output lines for each bus. That is, the buses are unidirectional within the physical layer. Bus arrangement 40, in contrast, between the modules, is bi-directional such that information can flow to or from a module on a single bus. Therefore, flip-flop interfaces 80 serve, in one way, to convert the unidirectional buses of the physical layer to the bi-directional bus arrangement. To that end, flip flop interfaces 80 provide separate input and output lines for connection to the physical layer (i.e., the module connecting side) which are denoted as ADDR/DATA IN lines 102 and ADDR/DATA OUT lines 104. On the bus arrangement side (i.e., bus connecting side) of flip-flop interfaces 80a and 80b, a single ADDR/DATA line 106 connects directly to a single bus line (ADDR 0, in the present example) which extends between the modules of system 10. It is to be understood that all address and data bus lines interconnect in the manner illustrated with regard to ADDR 0. The nomenclature "ADDR/DATA" has been selected for the reason that modules 80 may be used without modification on either a dedicated address bus (address bus 50, in the present example), a dedicated data line (DATA A or B, in the present example) or on a multiplexed bus, as described in the above incorporated US application.

In accordance with the present invention, it is important to note that, irrespective of the number of address and data buses which make up a particular bus arrangement, no active circuitry is present between the flip-flop interfaces (i.e. between dashed lines 108a and 108b in FIG. 3). That is, a standard is imposed which requires that the address and data bus lines consist solely of conductors which extend between the flip-flop interfaces associated with the various modules, At first blush, implementation of this standard might appear as a relatively straightforward task. However, the reader is reminded that, in the prior art, logic circuitry is typically introduced in bus arrangements for purposes of resolving interface concerns. It is submitted that, in the prior art, no other viable solution exists for dealing with such interface concerns. In accordance with the present invention, interface concerns are handled entirely within the physical layer so as to eliminate the need for logic circuitry within the bus arrangement, Specific advantages of the bus arrangement of the present invention will become apparent immediately hereinafter in conjunction with a discussion of its operation as part of system 10.

Figure 4:
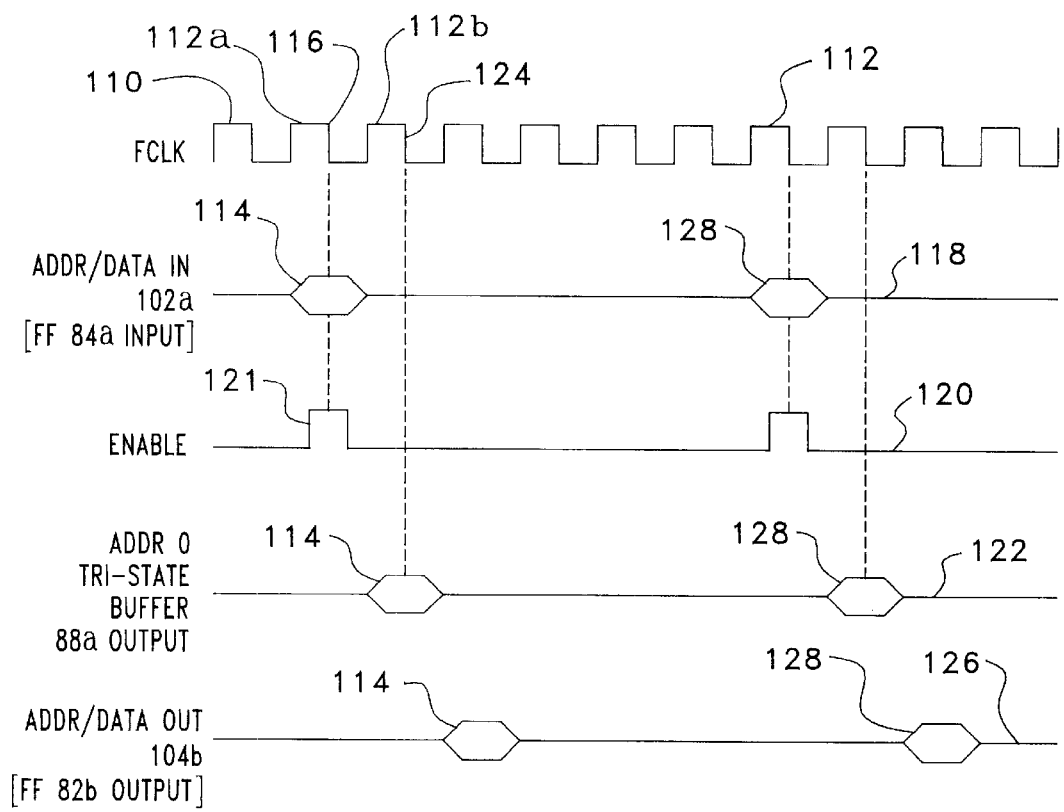
FIG. 4 is a waveform diagram which illustrates various control and information signals during the operation of the flip-flop interfaces shown in FIG. 3 in accordance with the present invention.

Referring to FIGS. 1–3 and having described the components which make up flip-flop interfaces 80, attention is now directed to the manner in which these circuits operate along with a discussion of the way in which address or data information is transferred between the modules of system 10 using bus arrangement 40. For exemplary purposes, the flow of information will be described as it occurs between host processor 12 and memory bank A on address line ADDR 0 of the bus arrangement. It should be appreciated that information flows simultaneously on each bus line (either address or data) extending between all modules of the system in a manner which is consistent with the present example. Assuming initially that addressing information intended for memory bank A is initially generated by host processor 12, the addressing information passes through host interface 18 (see FIGS. 1 and 2) and then through link and physical layer portions 46a and 48a, respectively, associated with the host processor. Within physical layer portion 48a, the addressing information reaches flip-flop interface 80a on ADDR/DATA IN line 102a. As will be seen, the addressing information is placed on the bus arrangement in a synchronized manner at an appropriate FCLK cycle, Referring now to FIG. 4 in conjunction with FIGS. 1–3, the previously described FCLK signal is provided to clock inputs 94 of all of the flip-flops which make up the flip-flop interfaces. As shown in FIG. 4, FCLK signal 110 consists of a series of pulses 112 which occur at a predetermined frequency as established by a particular implementation of system 10. The importance of the FCLK frequency will become apparent at an appropriate point below. With the presence of the aforedescribed addressing information (i.e., a "logic zero or one", in this instance) on ADDR/DATA IN line 102a, flip-flop 84a presents the addressing information as a bit 114 at its output 92a with the occurrence of a trailing edge 116 of an FCLK pulse 112a, as illustrated by flip-flop 84a output waveform 118, such that address bit 114 is available to input 96a of tri-state buffer 88a. It is noted that logic circuitry used herein is described as being negative edge triggered, however, other forms of triggering may readily be employed.

Concurrently, enable flip-flop 86a receives an enable signal 120. Specific details regarding the generation of the enable signal may be found in the above referenced U.S. application. For present purposes, it is sufficient to note that the enable signal is generated at the hardware level by the physical layer of a particular module which has been granted the use of the bus and which is transferring information, for example, during the execution of an addressing or data operation. An enable signal pulse 121 is clocked through flip-flop 86a at trailing edge 116 so as to enable tri-state buffer 88a such that the buffer leaves its high impedance state. Thereafter, the buffer drives bit 114 onto ADDR 0 bus line, as indicated by an output waveform 122 which represents the ADDR 0 signal. It is to be understood that buffer 88a, once enabled, drives the entire ADDR 0 bus line, which generally extends to all other modules within system 10. Of course, address lines ADDR 0–31 are all driven in a similar manner by other tri-state buffers in flip-flop interface 80a. For this particular example, it should be mentioned that only drive flip-flops associated with the host interface are enabled by physical layer 46b such that all other drive flip-flops within flip-flop interface arrangement 70 are not enabled.

With reference primarily to FIGS. 3 and 4, bit 114 of the present example arrives at flip-flop interface 80b on ADDR 0. Upon the occurrence of a trailing edge 124 of an FCLK pulse 112b, input flip-flop 82b latches bit 114 onto ADDR/DATA OUT line 104b and presents it to memory bank A via physical layer 48b, as shown by flip-flop output waveform 126. In fact, bit 114 is latched by all of input flip-flops at each module within the system. This sequence is repeated for a subsequent address bit which is indicated by the reference number 128. The transfer of bit 128 proceeds in a similar manner and, therefore, will not be described in detail.

One particular aspect regarding the operation of system 10 may readily be observed through the waveforms shown in FIG. 4. Specifically, it should be noted that a two clock cycle delay is introduced with respect to FCLK. That is, a signal, which is ready for transfer across the bus arrangement to another module, is clocked onto the bus arrangement (consisting only of conductors, in accordance with the teachings herein) in a first clock cycle (112a, for example). Thereafter, the signal is clocked off of the bus arrangement during a second clock cycle (112b, for example). Thus, the entire bus arrangement operates in a synchronous manner with respect to the FCLK signal. One of skill in the art might, at first, suspect performance degradation as a result of the two clock cycle delay. As will be seen immediately hereinafter, the present invention provides advantages in the design and operation of a digital system which have not been seen heretofore. Moreover, in view of the recent and continuing shift in computer applications towards streaming environments, it is submitted that the advantages provided herein will become still more pronounced since the present invention is particularly well suited to streaming environments. In this regard, it has been found that few, if any, disadvantages result, at least in part, due to the contemplated use of system 10 in a streaming environment. Performance advantages attendant to the use of the present invention in a streaming environment are attributable, at least in part, to higher system clock frequencies which are attained in accordance with the teachings herein.

It should be noted that one advantage of the present invention relates to the operational speed of a digital system. In this regard, the fastest possible electrical bus arrangement which can be implemented between discrete and/or integrated modules consists solely of electrical conductors. However, no practical design methodology or approach has been presented heretofore for use in designing complex digital systems in accordance with such an electrical interconnection scheme. Therefore, one of skill in the art will recognize that a bus arrangement produced in accordance herewith is capable of operating at the fastest possible clock rate for a given loading (i.e., number of modules connected to the bus arrangement) and for a given length (i.e., the physical length of the conductors which make up the bus arrangement). Viewed in a slightly different way, the present invention maximizes the number of modules which may be interconnected by a particular bus arrangement for a given clock frequency. In contrast, prior art interface conventions typically require the use of logic circuitry associated with at least some modules as part of the bus structure extending between the modules. As previously mentioned, this convention introduces a great deal of uncertainty in a structure which is already difficult to predict with regard to logic delays encountered by signals using the bus structure. In fact, logic related delays may be solely responsible for impeding the speed at which an IC or discrete module implementation may operate. Moreover, particularly with regard to IC design, the bus arrangement of the present invention, in consisting solely of conductors extending between the various modules, has been made as predictable as possible so as to alleviate design difficulties with regard to bus delays and timing concerns. That is, a designer may limit his or her concerns to bus loading and length.

Still considering the operational speed of a digital system, in a modular integrated circuit design environment as is contemplated by the present invention, the elimination of interface logic circuitry results in the capability for automated design of modular type IC's having the fastest possible bus arrangements in view of a particular bus layout and loading. In this way, reasonably simple design parameters, which are known in the art, may advantageously be used to determine a maximum clock frequency with a high degree of confidence.

As a related advantage, it should also be appreciated that the complexity of logic circuitry, present in bus arrangements of the prior art for interface purposes, is transferred to the physical layer of the present invention such that the actual transfer of data across the bus arrangement of the present invention is not influenced by interface related timing delays. That is, interface concerns are handled in the physical layer prior to the transfer of information over the bus arrangement. In fact, the physical layer of the present invention serves to isolate the complexity of the bus arrangement from the modules themselves. Specifically, the modules are essentially unaware of the manner in which the bus arrangement of the present invention operates with regard, for example, to the two cycle delay, as described above. Therefore, modules may be implemented in an essentially conventional manner with few or no special provisions being required for connection of individual modules to their respective physical layer portions. Stated in another way, a particular module is unaware (and has no need to be aware) of the highly advanced bus implementation with which it is, in fact, interfaced. Again, any required interfacing complexity on the module's behalf is handled at a hardware level within the physical layer, as described in the above referenced U.S. application.

It is to be understood that while the invention has been described with regard to the transfer of address and data information over a bus structure, in fact, bus structures include a control structure which, in the prior art, consists of control signal lines which extend between modules. In the prior art, these control signal lines are frequently implemented with logic circuitry intervening between the modules. Therefore, it should be understood that such control signal lines, like address and data lines described above, should be implemented in accordance with the teachings herein so that the use of intervening logic circuitry is avoided.

One skilled in the art may devise many alternative configurations for the bus arrangement and associated method disclosed herein. Therefore, it should be understood that the present invention may be embodied in many other specific forms without departing from the spirit or scope of the invention and that the present examples and method are to be considered as illustrative and not restrictive, and the invention is not to be limited to the details given herein, but may be modified within the scope of the appended claims.

What is claimed is:

1. In a digital system including three or more modules, which are configured for sending and receiving address and data information using one or more respective inputs and outputs, a bus arrangement comprising:
   a) an input arrangement including a plurality of first, input latches each of which includes an input terminal and an output terminal such that each module input is connected with the output terminal of an associated input latch;
   b) an output arrangement having a plurality of second, output latches each of which includes an input terminal and an output terminal such that each module output is connected with the input terminal of an associated output latch; and
   c) an interconnection arrangement made up solely of electrical conductors for electrically interconnecting the output terminals of certain output latches with the input terminals of certain input latches in a specific way for transferring said address and data information between said modules such that said address and data information does not encounter logic circuitry between the input and output arrangements.

2. The bus arrangement of claim 1 wherein each latch comprises a flip-flop.

3. The bus arrangement of claim 1 including means for generating a master clock signal and wherein said input and output latches each include a clock input which is driven by said master clock signal such that said data is transferred between said modules in timed relation to said master clock signal.

4. The bus arrangement of claim 1 wherein said output arrangement includes a plurality of buffer arrangements, such that one of said buffer arrangements is connected directly with the output of each one of said output latches, for selecting one or more output latches, associated with a particular module, such that address and data information initially generated by the particular module passes from the selected output latches to said certain input latches.

5. The bus arrangement of claim 4 wherein each said buffer arrangement includes a tri-state buffer.

6. The bus arrangement of claim 5 wherein each tri-state buffer includes an enable input, a data input and a data output, said data input of each buffer being connected with the output of a respective output latch such that enable signals which are generated in a particular way and which are, thereafter, provided at the enable inputs of certain tri-state buffers cause the tri-state buffers to present said address and data information from the output terminals of said selected output latches to the input terminals of said certain input latches.

7. The bus arrangement of claim 6 wherein said output arrangement includes a plurality of drive latches each of which includes an input terminal and an output terminal such that the output terminal of each drive latch is electrically connected with a respective one of the enable inputs of said tri-state buffers so as to provide said enable signals to the tri-state buffers.

8. The bus arrangement of claim 7 wherein said output arrangement includes a control arrangement for providing drive signals to the input terminal of each drive latch such that said address and data information from the output terminals of said selected output latches is presented to the input terminals of said certain input latches based, at least in part, upon said drive signals.

9. The bus arrangement of claim 8 including means for generating a master clock signal and wherein each latch includes a clock input which is driven by said master clock signal such that said address and data information, initially generated by said particular module, is transferred from the output terminals of said selected output latches to the input terminals of said certain input latches in timed relation to said master clock signal and to said drive signals.

10. The bus arrangement of claim 7 wherein each latch comprises a flip-flop.

11. In a digital system including three or more modules, which are configured for generating and receiving address and data information using one or more respective inputs and outputs, and a bus arrangement interconnecting said modules in a specific way, a method for transferring address and data information between said modules, said method comprising the steps of:
   a) providing a single master clock signal to said modules;
   b) using a first one of said modules, generating data for use by a second one of said modules;

c) during a first cycle of said master clock signal using first latching means, latching said generated data from said first module;

d) during a second cycle of said master clock signal transferring the latched data from said first latching means to a second latching means, and e) using said second latching means, latching the transferred data such that the latched transferred data is available during a third cycle of said master clock signal for use by said second module.

12. In a digital system including three or more modules, which are configured for sending and receiving address and data information using one or more respective inputs and outputs, a method comprising the steps of:

a) connecting a plurality of first, input latches each of which includes an input terminal and an output terminal such that each module input is connected with the output terminal of an associated input latch;

b) connecting a plurality of second, output latches each of which includes an input terminal and an output terminal such that each module output is connected with the input terminal of an associated output latch; and c) using an interconnection arrangement made up solely of electrical conductors for electrically interconnecting the output terminals of certain output latches with the input terminals of certain input latches in a specific way for transferring said address and data information between said modules such that said address and data information does not encounter logic circuitry between the certain input and output latches.

13. The method of claim 12 further comprising the steps of generating a master clock signal and driving said input and output latches using the master clock signal such that said address and data information is transferred between said modules in timed relation to said master clock signal.

14. The method of claim 12 further comprising the steps of selecting one or more output latches, associated with a particular module, and passing said address and data information initially generated by the particular module from the selected output latches to said certain input latches.

15. In a digital system including three or more modules, which are configured for sending and receiving address and data information using one or more respective inputs and outputs, a bus arrangement comprising:

a) a bus input section electrically connected with every module output configured to accept the address and data information from all of said modules such that, during a particular clock cycle, data from a particular one of the modules is received and latched by the bus input section;

b) an interconnection arrangement made up solely of electrical conductors connected with the bus input section for receiving and transferring the address and data information latched by the bus input section; and c) a bus output section electrically connected with the interconnection arrangement and configured for receiving and latching transferred address information from the interconnection arrangement at every one of said modules during a subsequent data cycle such that the transferred address and data information is transferred between the bus input section and the bus output section without encountering logic circuitry.

* * * * *